United States Patent
Bauer

(10) Patent No.: US 7,026,016 B2
(45) Date of Patent: Apr. 11, 2006

(54) METHOD OF FABRICATING FREE STANDING OBJECTS USING THERMAL SPRAYING

(76) Inventor: Eric C. Bauer, 75 Vermont Route 100, Duxbury, VT (US) 05660

( * ) Notice: Subject to any disclaimer, the term of this patent is extended or adjusted under 35 U.S.C. 154(b) by 126 days.

(21) Appl. No.: 10/750,938

(22) Filed: Jan. 2, 2004

(65) Prior Publication Data
US 2005/0147764 A1 Jul. 7, 2005

(51) Int. Cl.
*C23C 4/02* (2006.01)
(52) U.S. Cl. ............... 427/449; 427/446; 427/453; 427/455; 427/456
(58) Field of Classification Search ............ 427/446, 427/449, 453, 455, 456
See application file for complete search history.

(56) References Cited

U.S. PATENT DOCUMENTS

| | | | |
|---|---|---|---|
| 2,447,620 A | 8/1948 | Singleton et al. | |
| 3,826,301 A | 7/1974 | Brooks | |
| 3,909,921 A | 10/1975 | Brooks | |
| 4,062,160 A | 12/1977 | Christson | |
| 4,426,762 A | 1/1984 | Schnedecker | |
| 4,562,090 A | 12/1985 | Dickson et al. | |
| 5,110,631 A | 5/1992 | Leatham et al. | |
| 5,154,219 A | 10/1992 | Watson et al. | |
| 5,453,173 A | 9/1995 | Oyama | |
| 5,455,102 A | 10/1995 | Tsai | |
| 5,609,922 A | 3/1997 | McDonald | |
| 5,915,743 A | 6/1999 | Palma | |
| 6,296,043 B1 | 10/2001 | Bowen et al. | |
| 6,457,939 B1 | 10/2002 | Ghasripoor et al. | |
| 6,566,635 B1* | 5/2003 | Matsen et al. | 219/633 |
| 2004/0009106 A1* | 1/2004 | Galligan et al. | 422/180 |

FOREIGN PATENT DOCUMENTS

DE 195 20 146 C1 * 6/1996

OTHER PUBLICATIONS

Annon., "What is thermal spray?", www.sulzermetco.com, Dec. 12, 2003, pp. 1 to 14 as attached, published: Internet.

* cited by examiner

*Primary Examiner*—Katherine Bareford
(74) *Attorney, Agent, or Firm*—Howard J Walter

(57) ABSTRACT

The method of fabricating free standing objects using thermal spraying, preferably of a metal, in the following process. A wire mesh is formed into a three dimensional shape of the desired finished product and the shaped mesh is then thermally sprayed with a coating material to substantially cover the visible portions of the mesh. The preferred coating material is metal.

13 Claims, 3 Drawing Sheets

METHOD OF FABRICATING FREE STANDING OBJECTS USING THERMAL SPRAYING

BACKGROUND OF THE INVENTION

This invention relates to the fabrication of free standing objects utilizing thermal spraying technology and more particularly to the formation of works of art and other objects in which a material is melted and then caused to be sprayed onto a preformed screen-like substrate.

Thermal spraying is generally described as any process in which a material, usually a metal or alloy, is caused to be melted and then with the aid or air or other gas is propelled to the surface of a substrate where the melted metal solidifies to provide a coating on the substrate which provides a benefit to the substrate.

Common uses of thermal spraying include providing corrosion resistant coating on steel in automotive applications, providing abrasion resistance on high impact tool parts, providing hardness to turbine blades for the aircraft industry, providing dimensional control of critical parts, repairing of defective or worn parts and/or to enhance the electrical characteristics of a substrate.

In the century since the invention of thermal spraying, several similar but different methods have been widely used. These methods include the following:

1. Combustion Wire Spray—in which fuel gas such as acetylene, natural gas, hydrogen, propane, stabilized methylacetylene propadiene or other fuel and an oxygen source, burning at about 3,000 degrees Centigrade, are used to melt a wire composed of the material to be deposited which is then forced by compressed air through a nozzle and then deposited on a substrate. The material of the substrate is not critical except to the extent that the properties of the coated substrate need to meet the requirements of the intended application.

2. Combustion Powder Spray—in which a powered coating material is supplied to the gaseous combustion mixture instead of a wire. The use of a powder provides additional flexibility in the choice of coating materials. For example, aluminum oxides or ceramic materials may be used.

3. Electric Arc Wire Spray—in which two wires across which an electric arc is struck to provide the energy to melt the wire coating material which is then propelled to the surface of the substrate, as in the above processes. This process has the advantage of not requiring the use of fuel/oxygen gases.

4. High Velocity Oxygen Fuel Spray (HVOP)—in which a high velocity gas such as nitrogen is used to propel the coating powder into a cone-shaped flame where the coating material can be fully or partially melted resulting in a much more controlled deposition of the coating material.

5. Plasma Spray—in which a gaseous plasma is formed which can reach temperatures of 6,600 to 16,600 degrees Centigrade which can melt any coating material. Thus, this process has the ability to utilize the widest choice of coating materials. Local cooling of the substrate enables the temperature of the substrate to remain between 38 to 260 degrees Centigrade enabling virtually any material to be used depending on the application.

6. Chamber Controlled Atmosphere Thermal Spray—in this method the thermal spray process is carried out in a chamber in which all aspects of the environment can be controlled allowing the deposited coating can be more accurately controlled. For example, the thickness of coatings deposited in the first five methods is in the range of 0.5 to 2.5 mm; this process enables the thickness to range 0.05 to greater than 10 mm.

SUMMARY OF THE INVENTION

Accordingly, it is an object of this invention to enable the utilization of thermal spraying of any of the above types to be used to form a continuous coating on a free standing preformed mesh substrate.

It is another object of the invention to provide a method of fabricating free standing coated objects which could not otherwise be fabricated without great effort and expense.

It is yet another object of the invention to provide a method of fabricating large free standing metal objects at very low cost.

A further object of the invention is to provide a method of fabricating objects in which expensive surface preparation is not necessary.

The objects of the invention are achieved by the following method:

An open mesh cloth, preferably of metal, is formed into the shape of a free standing object generally having the shape and appearance of the desired finished product to act as a substrate, and thereafter, thermally spraying the substrate with a coating material to substantially cover all of the exposed surface of the substrate to form a substantially continuous and non-perforate layer of coating material.

These and other objects of the invention will be more clearly understood in conjunction the following description of the preferred embodiment and the associated drawings.

DETAILED DESCRIPTION OF THE INVENTION

In order to fully understand the scope of the invention, the following terms used herein are hereby defined.

Thermal spraying means any process by which a coating material is heated and melted or partially melted and thereafter projected on to the surface of a substrate where upon it is solidified. Thermal spraying includes all of the processes described above and any process in which similar process conditions are met.

It should be understood that thermal spraying is a "line of sight" process in which only surfaces which can be sprayed directly can be coated. While there are nozzle configurations which can be used to reach inside or partially inside of confined spaces, not all of the surfaces of a partially closed object can be coated. The term "coating all of the exposed surfaces" means those surfaces which can be "seen" by the spray nozzle.

Substrate means a mesh-like fabric which can be formed into the general shape of a free standing object to be subsequently thermally sprayed to provide the object to be produced. Such fabric includes conventional metal screen material which by bending and manipulation can be easily formed into any of various configurations having closed and open structures.

Coating material means any material capable of being thermally sprayed onto a mesh-like substrate, typical materials are available in wire or powder form and are primarily pure metals and metal alloys, as illustrated by, but not limited to, the examples described herein.

Wire coating source material can be obtained as pure metals such as aluminum, copper, molybdenum, tin and zinc and alloys of the following base metals: aluminum, copper, iron, and nickel, such as brass and a variety of bronzes.

Powder coating source material can be obtained in the same pure metals as wire source material and also in metal oxides or ceramic powders such as: aluminum oxide, chrome oxide, titanium oxide and zirconium oxide. Polymer powders such as polyesters are known to be used in the aircraft industry.

Although specific processes may not be known for a particular material, virtually any material that can be melted can be thermally sprayed.

Figure 1:
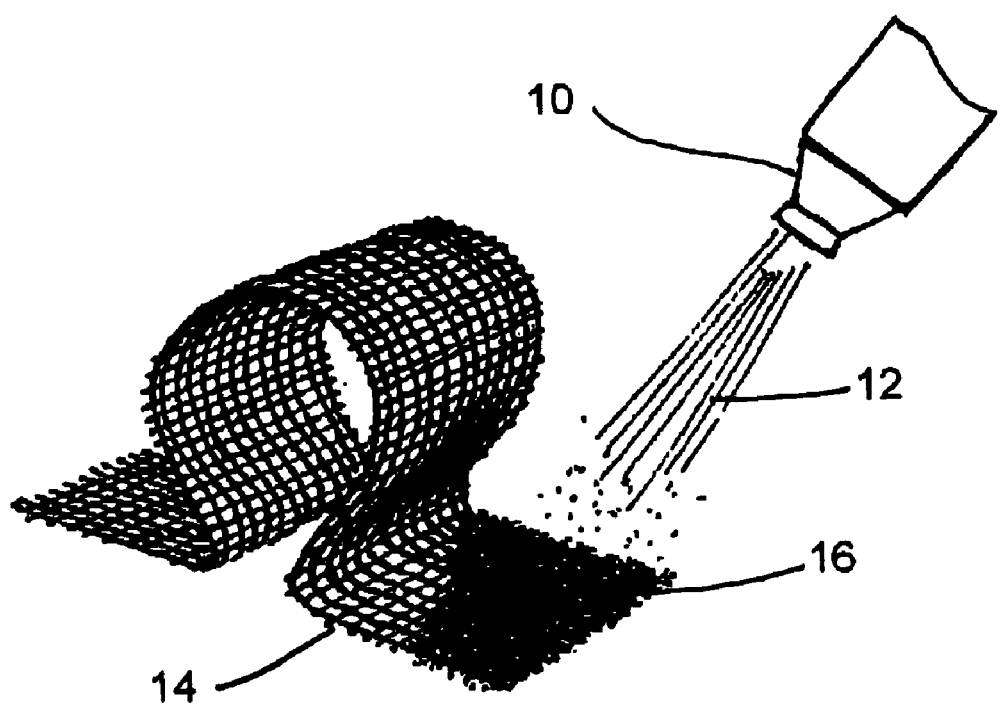
FIG. 1 is a schematic representation of the thermal spraying of a preformed wire mesh as a step in practicing the invention.

Referring now to FIG. 1, there is shown a schematic representation of the process of the invention. Thermal spray nozzle 10 sprays melted coating material 12, i.e. metal, for example zinc, on to a preformed wire mesh 14 to form a hardened coating of metal 16.

The preformed wire mesh 14 should be suitable of being formed or deformed into the desired shape of the finished product. Since it is desirable that the mesh be incorporated into the finished product, it is preferred that all of the exposed mesh be covered by the coating material, Ordinary wire screening is a suitable material and can be made of copper, aluminum, stainless or carbon steel or, if the temperature of the depositing coating material is below the melting point of the mesh material, then a stiff plastic screen can be used. In addition, the formed substrate can be made of any material which will be compatible with the thermally sprayed coating material.

The use of a mesh substrate rather than a solid surface enables easy bonding of the coating material to the mesh by virtue of the ability of the sprayed material to locally encapsulate portions of the mesh and bond to itself.

The curved shape chosen for the shape of the screen 14 in FIG. 1 makes it easy to manipulate the substrate and the spray nozzle so as to completely cover all exposed portions of the mesh substrate.

As will be illustrated below, it is not always desirable or possible to completely encapsulate the entire mesh substrate, it is intended that the entire visible portion of the substrate be covered.

Figure 2:
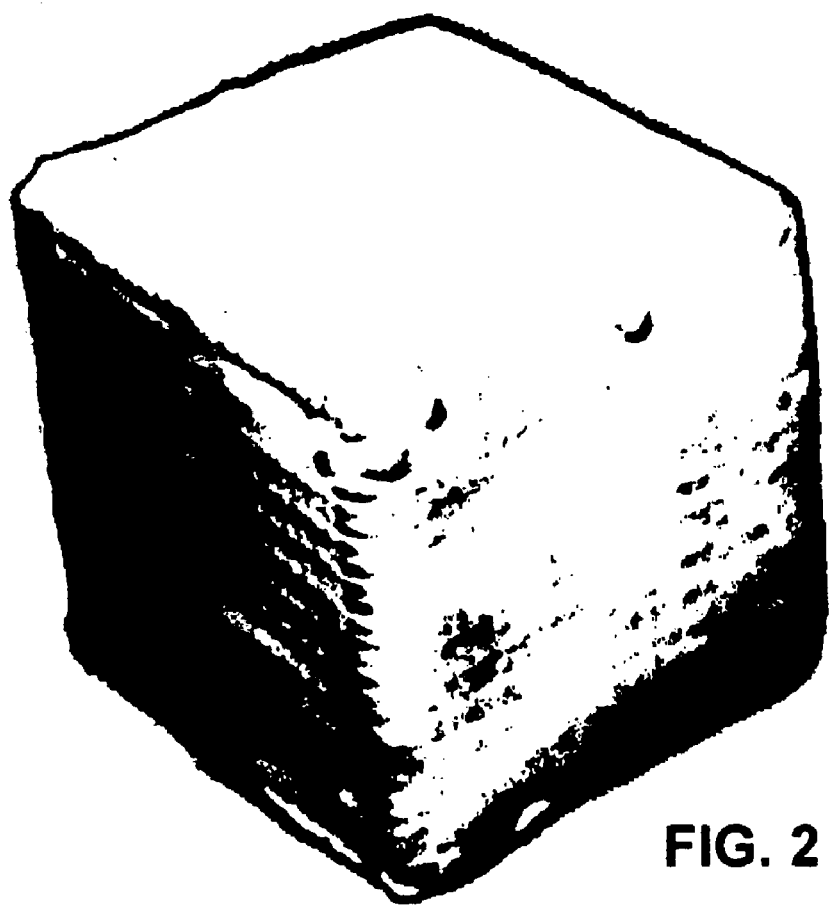
FIG. 2 is an isometric view of a free standing wire mesh cube thermally sprayed with zinc.

Referring to FIG. 2, there is shown a free standing thermally coated product in the form of a three-dimensional cube. The process steps included: the cutting and formation of a wire mesh replica of a common cube. The wire mesh was then thermally sprayed using zinc wire as the coating material source. Depending upon the thickness of the deposited zinc, there is more or less replication of the mesh pattern on the surface of the product.

Should a smooth surface be desired, the exterior surface of the product can be polished or buffed smooth.

Figure 3:
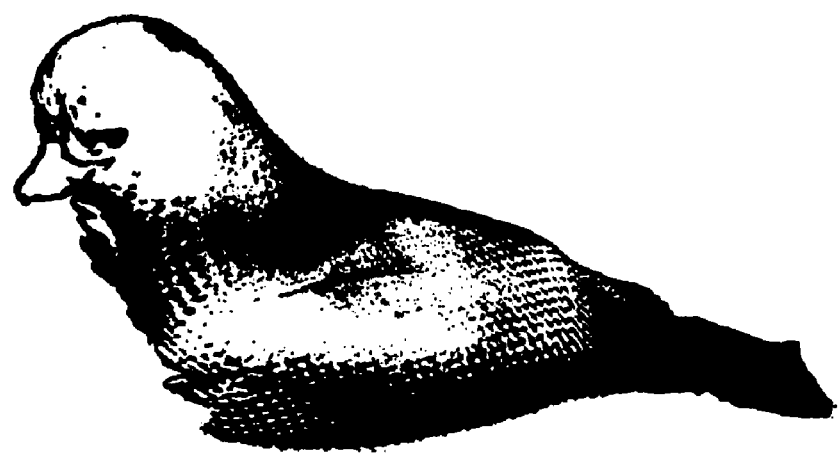
FIG. 3 is a view of a coated substrate comprising a wire mesh in the shape of a bird after being thermally sprayed with zinc and then thermally spray coated with silicon bronze.

FIG. 3 demonstrates another feature of the invention as it shows a product in the form of a bird suitable as an ornamental object which is highly resistant to environmental conditions. The shaped wire mesh object was first thermally sprayed with zinc to solidify the wire shaped form, then coated with silicon bronze. Note that while substantially all of the substrate is formed of a wire mesh, a small portion, the beak, is rendered free hand. Note also that the thickness of the deposited coating material is not uniform throughout the surface of the product, as the mesh pattern is not fully encapsulated into a continuous surface at the bottom of the figure, leaving a perforated surface.

Figure 4:
FIG. 4 is a view of a complex free standing object having convex and concave surfaces form using the process of the invention.

FIG. 4 demonstrates another feature of the invention as it shows a structure having both concave and convex surfaces. Here a free form vase-like product has been formed in which the resulting structure is incapable of being formed by conventional sand casting or other molding techniques. Note that any shape capable of being formed by the mesh substrate can be formed and then thermally sprayed to form a unitary solid product. In this case, while the entire visible portion of the product is coated, some portions of the interior of the product need not be coated.

While the invention has been described in terms of limited embodiments, it will be understood by those skilled in the art that various changes in the details of the invention without violating the spirit of the invention.

What is claimed is:

1. The method of fabricating a free standing object comprising the steps of:
    forming an open mesh substrate into a three-dimensional free standing object generally having the shape and appearance of the desired finished free standing object, and
    thermally spraying the free standing shaped mesh with a coating material to substantially cover all of the exposed surface of the substrate to form a substantially continuous and non-perforate layer of coating material.

2. The method of claim 1 wherein the open mesh substrate is a wire mesh.

3. The method of claim 2 wherein the wire is formed of woven copper, aluminum, carbon steel or stainless steel.

4. The method of claim 1 wherein the coating material comprises a metal.

5. The method of claim 4 wherein the metal is a substantially pure metal.

6. The method of claim 5 wherein the metal is zinc.

7. The method of claim 4 wherein the metal is an alloy.

8. The method of claim 1 wherein the coating material comprises a wire.

9. The method of claim 8 wherein the thermal spraying step comprises an electric arc wire spray method.

10. The method of claim 9 wherein the coating material comprises two similar or dissimilar conductive wires.

11. The method of claim 1 wherein the coating material comprises a powder.

12. The method of claim 1 wherein the mesh substrate has both concave and convex compound surfaces.

13. The method of claim 1 wherein the coating material is chosen from the group consisting of: aluminum, copper, molybdenum, tin and zinc, alloys of aluminum, copper, iron and nickel, and metal oxides, including aluminum oxide, chrome oxide, titanium oxide and zirconium oxide.

* * * * *